US012627093B2

(12) United States Patent
Xu et al.

(10) Patent No.: US 12,627,093 B2
(45) Date of Patent: May 12, 2026

(54) PRESS-FIT CONNECTOR AND WIRELESS CHARGING COIL MODULE

(71) Applicant: Steward (Foshan) Magnetics Co., Ltd., Foshan City (CN)

(72) Inventors: Jonson Xu, Foshan City (CN); Yeat Shing Chiang, Foshan City (CN)

(73) Assignee: Steward (Foshan) Magnetics Co., Ltd., Foshan City (CN)

( * ) Notice: Subject to any disclaimer, the term of this patent is extended or adjusted under 35 U.S.C. 154(b) by 804 days.

(21) Appl. No.: 18/090,643

(22) Filed: Dec. 29, 2022

(65) Prior Publication Data

US 2023/0216233 A1 Jul. 6, 2023

(30) Foreign Application Priority Data

Mar. 31, 2022 (CN) .......................... 202210333958.7

(51) Int. Cl.
*H01R 13/516* (2006.01)
*H01R 9/22* (2006.01)
(Continued)

(52) U.S. Cl.
CPC ........... *H01R 13/516* (2013.01); *H01R 9/223* (2013.01); *H01R 13/05* (2013.01);
(Continued)

(58) Field of Classification Search
CPC .... H01R 13/516; H01R 13/518; H01R 13/08; H01R 9/223; H01R 13/05; H01R 13/4226;
(Continued)

(56) References Cited

U.S. PATENT DOCUMENTS 9,040,844 B2 * 5/2015 Goto .................. H01R 12/7082
174/267
9,325,088 B2 * 4/2016 Yagi ....................... H01R 12/73
(Continued)

FOREIGN PATENT DOCUMENTS

CN 209168921 U 7/2019
DE 102007005877 A1 8/2008
(Continued)

OTHER PUBLICATIONS

European Search Report dated May 31, 2023 for EP22217186.0 that claims priority to the same parent application as the instant application; 10 pages.

*Primary Examiner* — Renee S Luebke
*Assistant Examiner* — Paul D Baillargeon
(74) *Attorney, Agent, or Firm* — Harness, Dickey & Pierce, P.L.C.; Anthony G. Fussner

(57) ABSTRACT

The present invention discloses a press-fit connector and a wireless charging coil module, the press-fit connector is connected to a package module, the package module can be inserted and matched with an external module, wherein the press-fit connector comprises: a connector housing having at least one press-fit terminal disposed thereon, the press-fit terminal being formed with a plug end protruding from the connector housing; and a flexible adjustment member connected between the connector housing and the package module, the flexible adjusting member being capable of adjusting an interface position of each plug end and each inserting slot of the external module in a state that the package module is interfaced with the external module. With the press-fit connector and the wireless charging coil module of the present invention, it is possible to save the welding process cost of at client side and facilitate plug and play by the client.

24 Claims, 7 Drawing Sheets

(51) Int. Cl.
  *H01R 13/05*       (2006.01)
  *H01R 13/422*      (2006.01)
  *H02J 50/00*       (2016.01)
  *H02J 50/10*       (2016.01)

(52) U.S. Cl.
  CPC ........ *H01R 13/4226* (2013.01); *H02J 50/005*
             (2020.01); *H02J 50/10* (2016.02)

(58) Field of Classification Search
  CPC .... H01R 12/585; H01R 12/91; H01R 13/501;
             H01R 13/6315; H02J 50/005; H02J 50/10
  See application file for complete search history.

(56)                References Cited

U.S. PATENT DOCUMENTS

| | | |
|---|---|---|
| 2008/0207020 A1 | 8/2008 | Decker et al. |
| 2011/0192641 A1 | 8/2011 | Goto |
| 2016/0336663 A1 | 11/2016 | Miyazaki |

FOREIGN PATENT DOCUMENTS

| | | |
|---|---|---|
| DE | 102020125574 B3 | 11/2021 |
| JP | 2013211499 A | 10/2013 |
| KR | 20190076462 A | 7/2019 |
| WO | WO-2008005945 A2 | 1/2008 |

* cited by examiner

PRESS-FIT CONNECTOR AND WIRELESS CHARGING COIL MODULE

CROSS REFERENCE TO RELATED APPLICATIONS

This application claims priority to and the benefit of Chinese Invention patent application No. 202111660452.9 filed Dec. 30, 2021 and Chinese Invention patent application No. 202210333958.7 filed Mar. 31, 2022. The disclosures of the applications identified in this paragraph are incorporated herein by reference in their entirety.

TECHNICAL FIELD

The present invention relates to the technical field of wireless charging, and in particular to a press-fit connector and a wireless charging coil module.

BACKGROUND ART

The description in this portion provides only background information related to the disclosure of the present invention and does not constitute prior art.

In an existing vehicle-mounted wireless charging coil module, there are usually two ways to connect the coil of the module to a client-side circuit board, one of which is that a leading-out coil end of the coil module is dipped in tin or added with a wire clip, and the leading-out coil end is soldered together with copper plated holes in the client-side PCB; the other of which is that a male joint with a pin is welded to the coil module, a female joint is welded to the client-side PCB, and finally the connection is realized through the male and female joints. In either one of the above ways, a welding process is required at the time of client-side application, thus increasing the product cost.

It should be noted that, the above introduction to the background is merely for the convenience of clear and complete description of the technical solution of the present invention, and for the convenience of understanding of persons skilled in the art. It cannot be regarded that the above technical solution is commonly known to persons skilled in the art just because that the solution has been set forth in the background of the present invention.

DISCLOSURE

It is an object of the present invention to provide a press-fit connector and a wireless charging coil module, which saves the welding process cost of at client side and facilitates plug and play by the client.

The above object of the present invention can be achieved by adopting the following technical solutions:

The present invention provides a press-fit connector being connected to a package module, wherein the package module can be inserted and matched with an external module, the press-fit connector comprises:

a connector housing having at least one press-fit terminal disposed thereon, the press-fit terminal being formed with a plug end protruding from the connector housing; and a flexible adjustment member connected between the connector housing and the package module, the flexible adjusting member being capable of adjusting an interface position of each plug end and each inserting slot of the external module in a state that the package module is interfaced with the external module.

In an embodiment of the present invention, a plurality of press-fit terminals are arranged at intervals on the connector housing along a length direction thereof, the flexible adjustment member is connected to an end portion of the connector housing along a length direction thereof.

In an embodiment of the present invention, both ends of the connector housing along the length direction thereof are connected with the flexible adjustment members.

In an embodiment of the present invention, the flexible adjustment member has a first bending part, a connecting part and a second bending part which are connected in sequence, the first bending part is connected to the connector housing, the second bending part is connected to the package module, and a bending direction of the first bending part is opposite to that of the second bending part.

In an embodiment of the present invention, the first bending part is connected to an inner side of the connector housing that is close to the package module, the second bending part is connected to an outer edge of the package module; or the first bending part is connected to an outer side of the connector housing that is away from the package module, the second bending part is connected to an inner edge of the package module.

In an embodiment of the present invention, the connector housing has at least one plug-in slot, and the press-fit terminal is clamped within the plug-in slot by a snap-in structure.

In an embodiment of the present invention, the snap-in structure includes a plug-in wall and an elastic snap-in part, the elastic snap-in part can abut against the plug-in wall in an abutting direction of the press-fit terminal and the plug-in slot.

In an embodiment of the present invention, the plug-in wall is arranged on the press-fit terminal, the elastic snap-in part is connected to the inner wall of the plug-in slot.

In an embodiment of the present invention, the press-fit terminal has a press-fit body, two sides of the press-fit body are respectively formed with one plug-in wall, and the plug end is connected to one end of the press-fit body.

In an embodiment of the present invention, two of the plug-in walls are formed by bending both sides of the press-fit body toward the same side of the press-fit body.

In an embodiment of the present invention, two of the plug-in walls are formed by making both sides of the press-fit body protrude outward in a direction parallel to the press-fit body.

In an embodiment of the present invention, the elastic snap-in part is located on one side of the connector housing along the length direction thereof, the elastic snap-in part is connected with the plug-in slot through a connecting part, and the connecting part can abut against the plug-in wall along the length direction of the connector housing.

In an embodiment of the present invention, the elastic snap-in part is located on one side of the connector housing along the width direction thereof, the elastic snap-in part is connected with the plug-in slot through a connecting part, and the connecting part can abut against the plug-in wall along the width direction of the connector housing.

In an embodiment of the present invention, one side of the connector housing that is away from the package module is provided with a threading hole capable of communicating with the plug-in slot.

In an embodiment of the present invention, the plug end is provided with a through hole capable of adjusting width of the plug end.

In an embodiment of the present invention, the press-fit terminal is further provided with a wiring end, the wiring end is disposed opposite to the plug end, and the wiring end is disposed protrusively from the other side of the connector housing.

In an embodiment of the present invention, the wiring end is formed with an open wire groove.

The present invention further provides a wireless charging coil module, comprising:

a press-fit connector as described above;

an enclosure for accommodating a coil, wherein the press-fit connector is elastically connected with the enclosure.

The present invention has the following features and advantages: in the press-fit connector and the wireless charging coil module of the present invention, the press-fit connector realizes plug-in connection between the package module and an external module through a press-fit terminal, which saves the welding process between the press-fit terminal and the external module, and facilitates the assembling connection between the package module and the external module. In addition, through the design of the flexible adjustment member, it is helpful to eliminate the large stress when assembling the package module and the external module, and can make the press-fit terminal adaptively adjust an interface position of each plug end and each plug-in slot of the external module.

DESCRIPTION OF DRAWINGS

In order to more clearly explain the technical solution in the embodiments of the invention, drawings that need to be used in description of the embodiments will be simply introduced below, obviously the drawings in the following description are merely some examples of the invention, and it is also possible for persons ordinarily skilled in the art to obtain other drawings according to the following drawings without making creative efforts.

DESCRIPTION OF THE REFERENCE NUMERALS

10. press-fit connector; 20. package module; 30. external module; 301. plug-in slot; 302. plating;

1. connector housing; 11. press-fit terminal; 111. press-fit body; 12. plug end; 121. through hole; 13. plug-in slot; 131. threading hole; 14. snap-in structure; 141. plug-in wall; 142. elastic snap-in part; 143. connecting part; 15. wiring end; 151. open wire groove; 152. leading-out coil end; 16. enclosure; 161. accommodating groove; 162. hook; 2. flexible adjustment member; 21. first bending part; 22. connecting part; 23. second bending part;

B. plug-in direction; F. length direction; W. width direction.

DETAILED DESCRIPTION OF THE PREFERRED EMBODIMENTS

Hereinafter the technical solution in the embodiments of the present invention will be described clearly and completely in combination with the accompanying drawings in the embodiments of the present invention, and obviously the described embodiments are merely part of the embodiments, not all of the embodiments. Based on the embodiments of the present invention, all other embodiments that are obtained by persons skilled in the art without making creative efforts fall within the protection scope of the present invention.

It should be noted that when an element is referred to as being "disposed" on another element, it may be directly on another element or there may be another element in the middle. When one element is considered to be "connected" to another element, it may be connected directly to another element or there may be another element in the middle. The terms "vertical," "horizontal," "left," "right" and other similar expressions used herein are used for illustrative purposes only and are not meant to be the only embodiment.

Unless otherwise defined, all technical and scientific terms used herein have the same meanings as that are generally understood by those skilled in the art belonging to the technical field of the present invention. The terms used herein in the description of the invention are for purposes of describing specific embodiments only and are not intended to limit the invention. The terms "and/or" as used herein include any and all combinations of one or more related listed items.

First Embodiment

Figure 1:
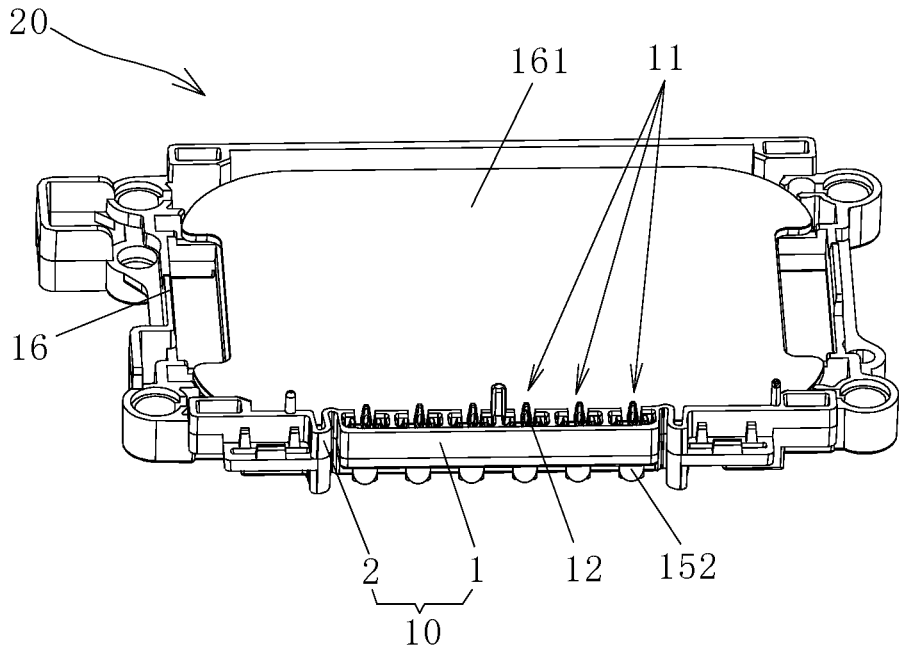
FIG. 1 is a stereoscopic schematic view showing a package module/a wireless charging coil module of the present invention.
Figure 8:
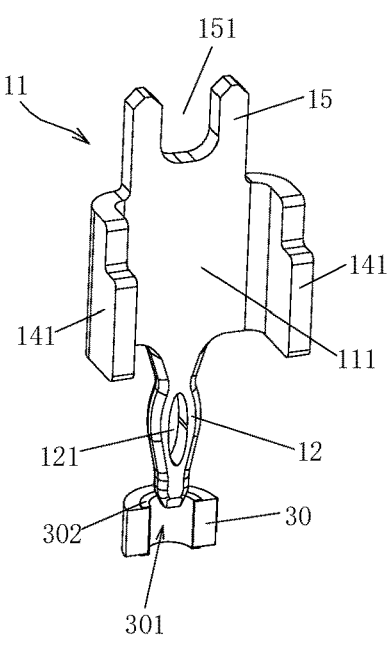
FIG. 8 is a structural schematic diagram of plug-in connection between a plug end of the press-fit terminal and a plug-in slot on the external module/PCB.

As shown in FIGS. 1 and 8, the present invention provides a press-fit connector 10 being connected to a package module 20, wherein the package module 20 can be engaged with an external module 30 by plugging. The press-fit connector 10 comprises a connector housing 1 and a flexible adjustment member 2, wherein the connector housing 1 is provided with at least one press-fit terminal 11, the press-fit terminal 11 is formed with a plug end 12 protruding from the connector housing 1; the flexible adjustment member 2 is connected between the connector housing 1 and the package module 20, the flexible adjusting member 2 is capable of adjusting an interface position of each plug end 12 and each inserting slot 301 of the external module 30 in a state that the package module 20 is interfaced with the external module 30.

With the press-fit connector 10 of the present invention, plug-in connection between the package module 20 and the external module 30 is realized through a press-fit terminal 11, which saves the welding process that is required on and between the package module 20 and/or the external module 30, and facilitates the assembling connection between the package module 20 and the external module 30. In addition, through the design of the flexible adjustment member 2, it is helpful to eliminate the large stress generated when assembling the package module 20 and the external module 30, and can make the press-fit terminal 11 adaptively adjust an interface position of each plug end 12 and each plug-in slot 301 of the external module 30, thereby improving the assembly efficiency.

Figure 2:
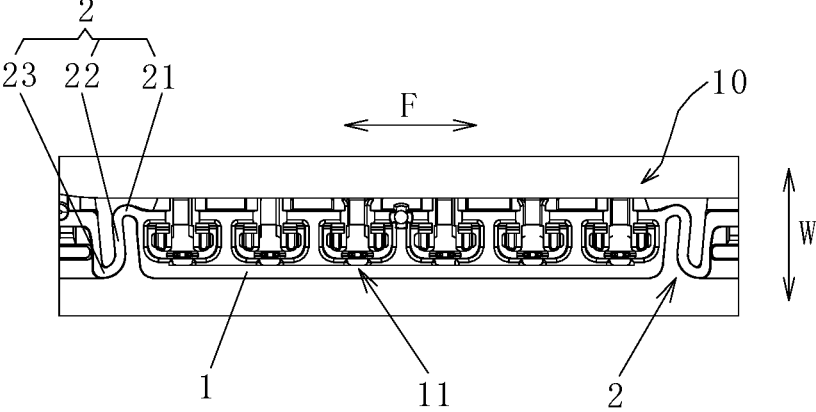
FIG. 2 is a top view structural schematic of a press-fit connector of the present invention.
Figure 3:
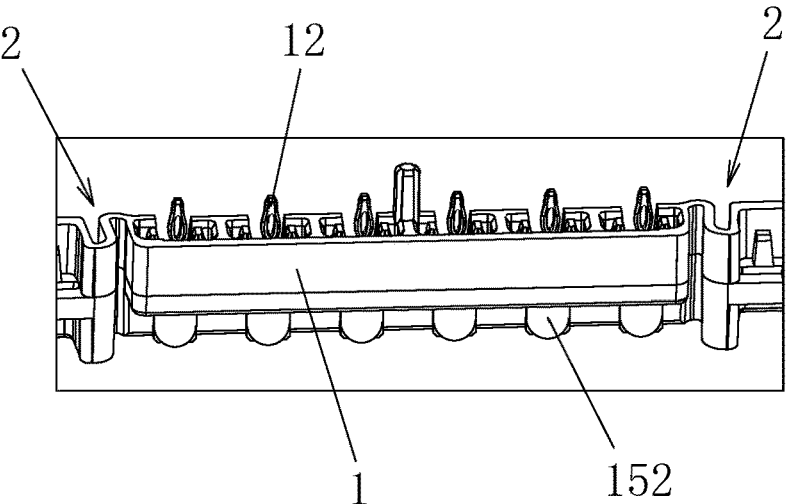
FIG. 3 is a perspective view of the press-fit connector of the present invention.

Specifically, as shown in FIG. 2, the press-fit connector 10 has a substantially rectangular parallelepiped shape, and a plurality of press-fit terminals 11 are arranged at intervals in a length direction F of the press-fit connector 10, the plug end 12 of each press-fit terminal 11 is arranged to protrude from one side of the press-fit connector 10 so as to be interfaced and inserted into the plug-in slot 301 of the external module 30. In this embodiment, the package module 20 is a wireless charging coil module which includes an enclosure 16, the enclosure 16 is substantially in the shape of a rectangular parallelepiped frame within which an accommodating groove 161 for placing the wireless charging coil is formed. A notch portion is formed at one side edge of the enclosure 16, and the press-fit connector 10 is located at the notch portion, so that the outer contour of the package module 20 is formed into a complete rectangular parallelepiped frame shape and has a complete shape, which facilitates mating with other external components. In this embodiment, the length direction F of the press-fit connector 10 may be a direction in which a long side of the enclosure 16 is located. Of course, in other embodiments, the length direction F of the press-fit connector 10 may also be a direction in which a short side of the enclosure 16 is located, which is not limited here.

The flexible adjustment member 2 is connected to an end portion of the connector housing 1 along a length direction thereof, so that the position of each press-fit terminal 11 on the connector housing 1 in the length direction F can be adaptively adjusted, so as to be inserted and matched correspondingly with each plug-in slot 301 of the external module 30. In this embodiment, each of both ends of the connector housing 1 along the length direction F thereof is connected with one flexible adjustment member 2, thereby increasing the adjustable range between the connector housing 1 and the package module 20, so that the connector housing 1 can be flexibly changed in an area where the press-fit terminal 11 is located, that is, the amplitude of movement of the connector housing 1 in this area relative to the package module 20 can be adjusted along the length direction or the width direction of the connector housing 1 to facilitate increasing the flexibility of the terminal area of the package module 20. Alternatively, it is also possible to provide a flexible adjustment member 2 on only one end of the connector housing 1.

In the present invention, when the plurality of press-fit terminals 11 of the package module 20 are inserted into the plurality of plug-in slots 301 of the external module 30, due to the presence of the flexible adjustment member 2, on the one hand, when the center of the plug end 12 is offset from the center of the plug-in slot 301 of the external module 30, the position of the center of the plug end 12 can be adaptively adjusted as the flexibility of the connector housing 1 changes, this prevents excessive bending deformation of the plug end 12 during the plugging process, which may lead to a risk of a hidden crack of the plug end 12 or the plug-in slot 301 of the external module 30, and finally lead to connection failure; on the other hand, a part of the stress caused by the plug-in mating can be eliminated or absorbed, thereby avoiding a large stress influence on the package module 20 or the external module 30.

As shown in FIG. 2, the flexible adjustment member 2 has a first bending part 21, a connecting part 22 and a second bending part 23 which are connected in sequence, the first bending part 21 is connected to the connector housing 1, the second bending part 23 is connected to the package module 20, and a bending direction of the first bending part 21 is opposite to that of the second bending part 23.

Specifically, the flexible adjustment member 2 is generally S-shaped, and is designed with an S-shaped structure. The flexible adjustment member 2 can be compressed or extended in the length direction F of the connector housing 1, and can be adjusted to be displaced in the width direction W of the connector housing 1, thereby enabling position adjustment of the connector housing 1 from multiple angles, thus during the assembling process of the package module 20 and the external module 30, it is possible to facilitate the accurate alignment and matching between each press-fit terminal 11 of the press-fit connector 10 and each plug-in slot 301 of the external module 30, and at the same time facilitate elimination of the stress generated during the connection and matching process.

In a feasible embodiment, as shown in FIG. 2, the first bending part 21 is connected to an inner side of the connector housing 1 that is close to the package module 20, and the second bending part 23 is connected to an outer edge of the package module 20. That is, the first bending part 21 is connected to a side of the connector housing 1 that is close to the accommodating groove 161, and the second bending part 23 is connected to a side of the enclosure 16 that is away from the accommodating groove 161, and thus, a connection with a substantially S-shaped bending structure is formed between the connector housing 1 and the enclosure 16.

Figure 9:
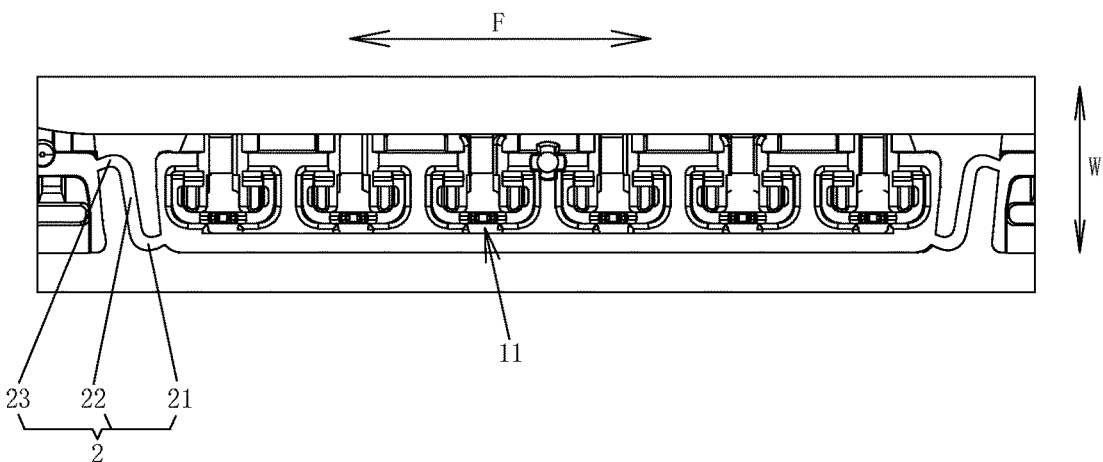
FIG. 9 is a perspective view of the press-fit connector according to another embodiment of the present invention.

In another feasible embodiment, as shown in FIG. 9, the first bending part 21 is connected to an outer side of the connector housing 1 that is away from the package module 20, and the second bending part 23 is connected to an inner edge of the package module 20. That is, the first bending part 21 is connected to a side of the connector housing 1 that is away from the accommodating groove 161, and the second bending part 23 is connected to a side of the enclosure 16 that is close to the accommodating groove 161, and thus, a connection with a substantially reverse S-shaped bending form is formed between the connector housing 1 and the enclosure 16.

In the present invention, when each of both ends of the connector housing 1 is connected with one flexible adjustment member 2, the two S-shaped flexible adjustment members 2 located at both ends of the connector housing 1 are in opposite directions, to facilitate flexibility adjustment of the connector housing 1.

Figure 6:
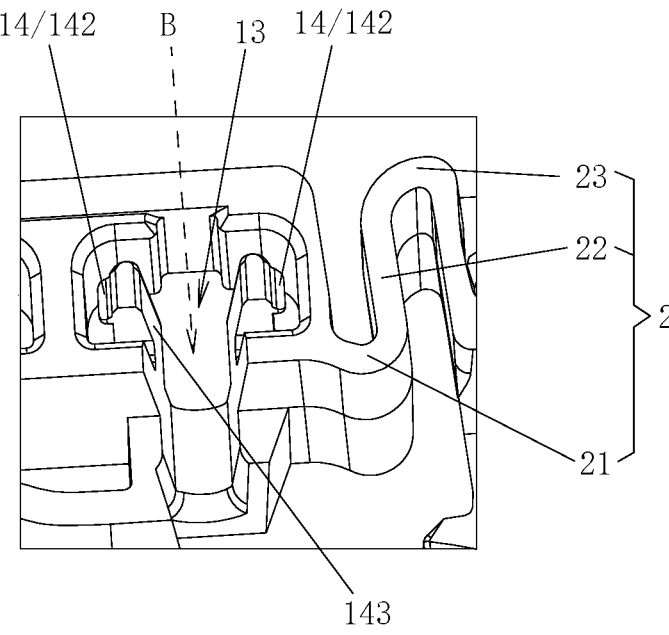
FIG. 6 is a structural schematic diagram of a plug-in slot of the press-fit connector according to an embodiment of the present invention.
Figure 7:
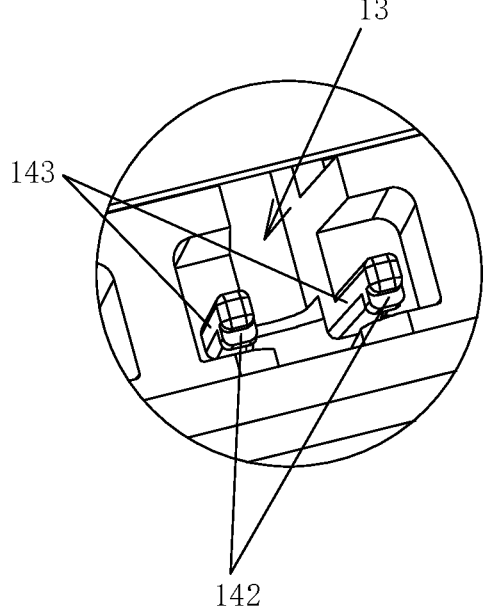
FIG. 7 is a structural schematic diagram of the plug-in slot of the press-fit connector according to another embodiment of the present invention.

According to an embodiment of the present invention, as shown in FIGS. 6 and 7, the connector housing 1 has at least one plug-in slot 13 in which the press-fit terminal 11 is snapped by a snap-in structure 14.

Figure 4:
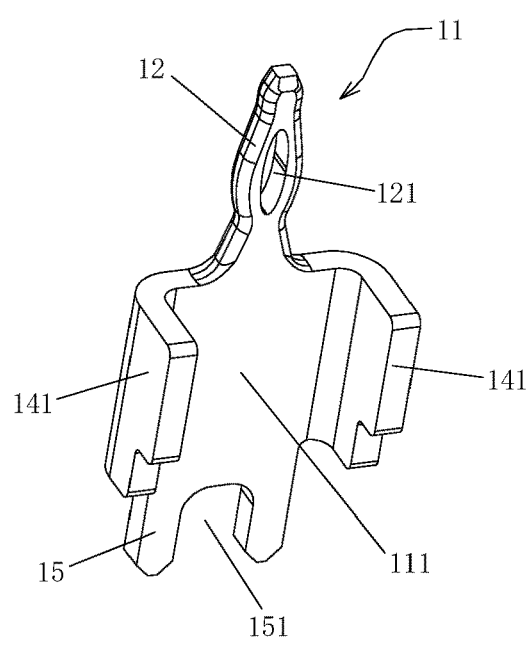
FIG. 4 is a perspective view of a press-fit terminal according to an embodiment of the present invention.
Figure 5:
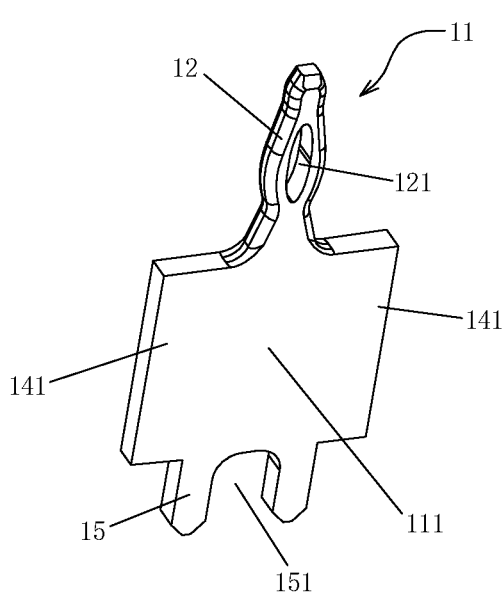
FIG. 5 is a perspective view of a press-fit terminal according to another embodiment of the present invention.

Specifically, as shown in FIGS. 4 and 5, the snap-in structure 14 includes a plug-in wall 141 and an elastic snap-in part 142 that can abut against the plug-in wall 141 in a direction opposite to the plug-in direction B in which the press-fit terminal 11 is inserted into the plug-in slot 13 to prevent the press-fit terminal 11 from being detached from the plug-in slot 13.

According to an embodiment of the present invention, the plug-in wall 141 is disposed on the press-fit terminal 11, and the elastic snap-in part 142 is connected to the inner wall of the plug-in slot 13.

As shown in FIGS. 2, 4 and 6, in this embodiment, the elastic snap-in part 142 is connected to the inner side of each plug-in slot 13 of the connector housing 1 along the length direction F thereof. The elastic snap-in part 142 can be connected to the plug-in slot 13, for example through the connecting part 143. The connecting part 143 can abut against and be matched with the plug-in slot 141 along the length direction F of the connector housing 1, so as to achieve to lock the press-fit terminal 11 and prevent the press-fit terminal 11 from shaking in the plug-in slot 13.

As shown in FIG. 4, the press-fit terminal 11 has a press-fit body 111, two sides of the press-fit body 111 are respectively formed with one plug-in wall 141, and the two plug-in walls 141 are formed by bending both sides of the press-fit body 111 toward the same side of the press-fit body 111, thus saving the processing cost and facilitating manufacturing; one end of the press-fit body 111 is formed with a plug end 12. When the press-fit terminal 11 is assembled with the plug-in slot 13 of the connector housing 1, the press-fit body 111 is embedded into the same side of the two elastic snap-in parts 142 in the plug-in slot 13, and the two plug-in walls 141 on the press-fit terminal 11 are matched and snapped with the two elastic snap-in parts 142, which facilitates positioning of the press-fit terminal 11 and also facilitates assembly and combination.

As shown in FIGS. 5 and 7, in another embodiment, the two elastic snap-in parts 142 in the plug-in slot 13 are located on one side of the connector housing 1 along the width direction thereof, the elastic snap-in part 142 is connected to the plug-in slot 13 through the connecting part 143, and the connecting part 143 can abut against the plug-in wall 141 in the width direction of the connector housing 1.

As shown in FIG. 5, the two plug-in walls 141 of the press-fit terminal 11 are formed by making both sides of the press-fit body 111 protrude outwards in a direction parallel to the press-fit body 111 to facilitate manufacturing. In this embodiment, when the press-fit terminal 11 is assembled with the plug-in slot 13 of the connector housing 1, the press-fit body 111 is embedded into the same side of the two elastic snap-in parts 142 in the plug-in slot 13, the two plug-in walls 141 are snapped by the two elastic snap-in parts 142, which not only facilitates improving the assembling efficiency, but also improves the overall strength of the press-fit terminal 11.

According to an embodiment of the present invention, the plug end 12 is provided with a through hole 121 capable of adjusting width of the plug end 12. Referring to FIG. 8, when the press-fit terminal 11 is plugged into the plug-in slot 301 of the external module 30, it is only necessary to insert the part of the plug end 12 with the through hole 121 into the plug-in slot 301. In the present invention, the external module 30 can be a PCB, and the plug-in slot 301 is a copper-plated hole on the PCB, that is, a layer of plating 302 is formed on an inner wall of the plug-in slot 301, and the plating 302 is formed, for example, by plating tin or gold on a nickel-plated base. The plug end 12 not only achieves the rapid plug-in connection between the package module 20 and the PCB without an additional welding process, but also ensures that the plug end 12 can be tightly connected in the copper-plated hole of the PCB in an interference fit manner by designing a through hole 121, so as to improve the stability of the mechanical connection and the electrical conductivity of the electrical connection.

Figure 11:
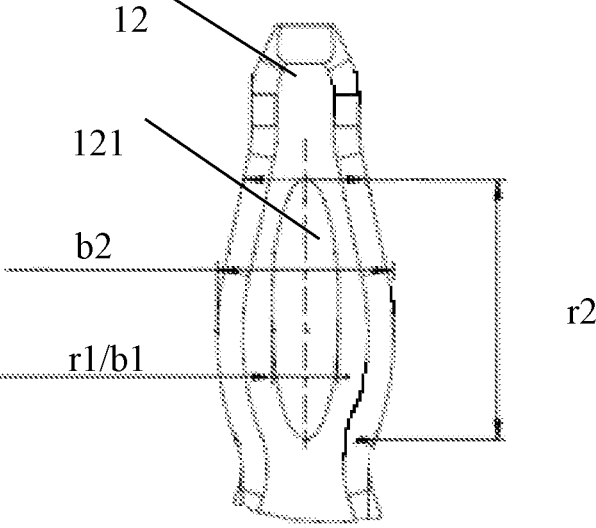
FIG. 11 is a structural schematic diagram of the plug end of the press-fit terminal of the present invention.

In addition, in this embodiment, the through hole 121 have a fish-eye shape, and the reliability of connection between the through hole 121 and the PCB can be ensured by reasonably designing the structure of the through hole 121 of fish-eye shape and correctly defining the parameters related to the copper-plated hole of the PCB. Specifically, as shown in FIG. 11, the ratio of a long inner diameter r2 to a short inner diameter r1 of the fish-eye shaped through hole 121 may be 3.6 to 4.2, and the ratio of the width b2 of the plug end 12 to the width b1 of the through hole 121 may be 2.4 to 2.9.

According to an embodiment of the present invention, as shown in FIGS. 4, 5 and 8, the press-fit terminal 11 is further provided with a wiring end 15 that is disposed opposite to the plug end 12 and is disposed to protrude from the other side of the connector housing 1.

Specifically, the wiring end 15 is formed with an open wire groove 151 for being welded with a leading-out coil end 152. When the press-fit terminal 11 is installed in place, the through hole 121 of the plug end 12 is located above the plastic-case surface of the connector housing 1.

The inventor has found that: when the outer wall surface of the connector housing 1 is of a closed structure, if it is desired to place the leading-out coil end into each plug-in slot 13 from above the enclosure 16, there is a high requirement for the tolerance of the length of a cutting pin of the leading-out coil end and the tolerance of the positioning dimension of the coil, and if the required accuracy requirement cannot be achieved, it is necessary to insert the leading-out coil end into the plug-in slot 13 first, and then complete the operation of inserting the coil into the housing.

Figure 10:
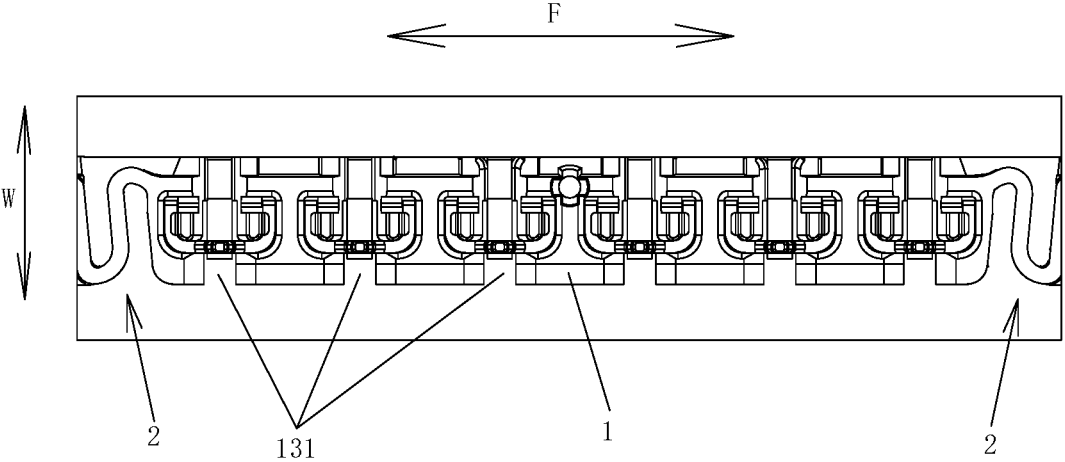
FIG. 10 is a perspective view of the press-fit connector according to yet another embodiment of the present invention.

On this basis, according to an embodiment of the present invention, as shown in FIG. 10, in order to facilitate the installation of the coil and improve the assembly efficiency and save the assembly process, one side of the connector housing 1 that is away from the package module 20 is provided with a threading hole 131 capable of communicating with the plug-in slot 13. When assembling the coil, the coil can be put into the accommodating groove 161 of the enclosure 16 first, and at the same time, the leading-out coil end can also be put into each plug-in slot 13 directly from above the enclosure 16 via each threading hole 131 without inserting the leading-out coil end into each plug-in slot 13 in advance and then putting the coil into the accommodating groove 161 of the enclosure 16.

Second Embodiment

The present invention further provides a wireless charging coil module, comprising a press-fit connector 10 as described in the first embodiment and an enclosure 16 for accommodating a coil, wherein the press-fit connector is elastically connected with the enclosure 16. In the present embodiment, the specific structure, operation principle and advantageous effects of the press-fit connector are the same as those of the press-fit connector described in the first embodiment, and detailed description thereof will be omitted.

In the wireless charging coil module of the present invention, the connector housing 1 is connected to the enclosure 16 for accommodating the coil via the flexible adjustment member 2, which helps to eliminate the large stress generated when assembling the package module 20 and the external module 30, and can make the press-fit terminal 11 adaptively adjust an interface position of each plug end 12 and each plug-in slot of the external module.

Any numerical value referred to herein includes all values of a lower value and an upper value that are incremented by one unit from a lower limit value to an upper limit value, with an interval of at least two units between any lower value and any higher value. For example, if it is stated that the number of components or process variables such as temperature, pressure, time, etc., have a value from 1 to 90, preferably from 20 to 80, more preferably from 30 to 70, the purpose is to illustrate that the values such as 15 to 85, 22 to 68, 43 to 51, 30 to 32, and so on are also explicitly recited in the specification. For values smaller than 1, one unit is suitably considered to be 0.0001, 0.001, 0.01, 0.1. These are merely intended to be explicitly expressed examples, and it may be considered that all possible combinations of numerical values enumerated between the lowest value and the highest value are explicitly set forth in a similar manner in this specification.

Unless otherwise stated, all ranges include end points and all numbers between the end points. The "about" or "approximate" used with the range is suitable for both end points of the range. Thus, "about 20 to 30" is intended to cover "about 20 to about 30," including at least the indicated end points.

All articles and references disclosed, including patent applications and publications, are incorporated herein by reference for all purposes. The term "consisting essentially of" to describe a combination should include the elements, components, parts or steps determined and other elements, components, parts or steps that do not substantially affect the substantially novel features of the combination. The use of the terms "comprising" or "including" to describe combination of the elements, components, parts or steps herein also contemplates embodiments that consist essentially of such elements, components, parts or steps. The use of the term "may" herein is intended to illustrate that any of the described attributes that may be included are optional.

The plurality of elements, components, parts or steps can be provided by a single integrated element, component, part or step. Alternatively, a single integrated element, component, part or step may be divided into separate multiple elements, components, parts or steps. A disclosed "a" or "an" used to describe an element, a component, a part or a step does not mean to exclude other elements, components, parts or steps.

It should be understood that the above description is for purposes of illustration and not for purposes of limitation. Many embodiments and many applications other than the examples provided will be apparent to those skilled in the art from reading the above description. Accordingly, the scope of the present teachings should not be determined with reference to the above description, but should be determined with reference to the appended claims and the full scope of equivalents owned by these claims. The disclosure of all articles and references, including patent applications and publications, is incorporated herein by reference for purposes of completeness. The omission of any aspect of the subject matter disclosed herein in the foregoing claims is not intended to waive the subject matter, and the inventor should not be deemed to have not considered the subject matter as a part of the disclosed subject matter.

The invention claimed is:

1. A press-fit connector configured to be connected to a package module whereby the package module can be inserted and matched with an external module, the press-fit connector comprising:

a connector housing having at least one press-fit terminal disposed thereon, the press-fit terminal being formed with a plug end protruding from the connector housing; and a flexible adjustment member connected between the connector housing and the package module when the press-fit connector is connected to the package module, the flexible adjusting member being capable of adjusting an interface position of each plug end and each inserting slot of the external module in a state that the package module is interfaced with the external module;

wherein the flexible adjustment member has a first bending part, a connecting part, and a second bending part which are connected in sequence, the first bending part is connected to the connector housing, the second bending part is connected to the package module, and a bending direction of the first bending part is opposite to that of the second bending part.

2. The press-fit connector of claim 1, wherein a plurality of press-fit terminals are arranged at intervals on the connector housing along a length direction thereof, the flexible adjustment member is connected to an end portion of the connector housing along a length direction thereof.

3. The press-fit connector of claim 2, wherein:
   the flexible adjustment member comprises two flexible adjustment members; and
   both ends of the connector housing along the length direction thereof are connected with a corresponding one of the two flexible adjustment members.

4. The press-fit connector of claim 1, wherein:
   the first bending part is connected to an inner side of the connector housing that is close to the package module, the second bending part is connected to an outer edge of the package module; or
   the first bending part is connected to an outer side of the connector housing that is away from the package module, the second bending part is connected to an inner edge of the package module.

5. The press-fit connector of claim 1, wherein:
   the connector housing has at least one plug-in slot; and
   the press-fit terminal is clamped within the plug-in slot by a snap-in structure.

6. The press-fit connector of claim 5, wherein:
   the snap-in structure includes a plug-in wall and an elastic snap-in part; and
   the elastic snap-in part can abut against the plug-in wall in an abutting direction of the press-fit terminal and the plug-in slot.

7. The press-fit connector of claim 6, wherein:
   the plug-in wall is arranged on the press-fit terminal; and
   the elastic snap-in part is connected to the inner wall of the plug-in slot.

8. The press-fit connector of claim 6, wherein:
   the press-fit terminal has a press-fit body;
   two sides of the press-fit body are respectively formed with one plug-in wall; and
   the plug end is connected to one end of the press-fit body.

9. The press-fit connector of claim 8, wherein two of the plug-in walls are formed by bending both sides of the press-fit body toward the same side of the press-fit body.

10. The press-fit connector of claim 9, wherein:
   the elastic snap-in part is located on one side of the connector housing along the length direction thereof;
   the elastic snap-in part is connected with the plug-in slot through a connecting part; and
   the connecting part can abut against the plug-in wall along the length direction of the connector housing.

11. The press-fit connector of claim 8, wherein two of the plug-in walls are formed by making both sides of the press-fit body protrude outward in a direction parallel to the press-fit body.

12. The press-fit connector of claim 11, wherein:

the elastic snap-in part is located on one side of the connector housing along the width direction thereof;

the elastic snap-in part is connected with the plug-in slot through a connecting part; and the connecting part can abut against the plug-in wall along the width direction of the connector housing.

13. The press-fit connector of claim 5, wherein one side of the connector housing that is away from the package module is provided with a threading hole capable of communicating with the plug-in slot.

14. The press-fit connector of claim 1, wherein the plug end is provided with a through hole capable of adjusting width of the plug end.

15. The press-fit connector of claim 1, wherein:

the press-fit terminal is further provided with a wiring end;

the wiring end is disposed opposite to the plug end; and the wiring end is disposed protrusively from the other side of the connector housing.

16. The press-fit connector of claim 15, wherein the wiring end is formed with an open wire groove.

17. A wireless charging coil module comprising:

a press-fit connector of claim 1; and an enclosure for accommodating a coil;

wherein the press-fit connector is elastically connected with the enclosure.

18. The wireless charging coil module of claim 17, wherein:

the enclosure is substantially in the shape of a rectangular parallelepiped frame within which an accommodating groove for placing the coil is formed;

a notch portion is formed at one side edge of the enclosure; and the press-fit connector is located at the notch portion, so that an outer contour of the package module is formed into a complete rectangular parallelepiped frame shape.

19. The wireless charging coil module of claim 17, wherein:

the first bending part is connected to an inner side of the connector housing that is close to the package module, the second bending part is connected to an outer edge of the package module, thus a connection with a substantially S-shaped bending structure is formed between the connector housing and the enclosure.

20. The wireless charging coil module of claim 17, wherein:

the first bending part is connected to an outer side of the connector housing that is away from the package module, the second bending part is connected to an inner edge of the package module, thus a connection with a substantially reverse S-shaped bending structure is formed between the connector housing and the enclosure.

21. The press-fit connector of claim 1, wherein:

the at least one press-fit terminal comprises a plurality of press-fit terminals arranged at intervals in a length direction of the press-fit connector;

the plug end of each press-fit terminal is arranged to protrude from one side of the press-fit connector so as to be interfaced and inserted into a plug-in slot of the external module.

22. The press-fit connector of claim 1, wherein the flexible adjustment member is configured to have a generally S-shaped structure.

23. The press-fit connector of claim 1, wherein the flexible adjustment member comprises two S-shaped flexible adjustment members located at both ends of the connector housing in opposite directions.

24. The press-fit connector of claim 1, wherein:

the connector housing has at least one plug-in slot;

the press-fit terminal is clamped within the plug-in slot by a snap-in structure;

the snap-in structure includes at least one plug-in wall and at least one elastic snap-in part, the elastic snap-in part can abut against the plug-in wall in an abutting direction of the press-fit terminal and the plug-in slot;

the plug-in wall is arranged on the press-fit terminal;

the elastic snap-in part is connected to the inner wall of the plug-in slot; and the at least one elastic snap-in part comprises two elastic snap-in parts in the plug-in slot.

\* \* \* \* \*